United States Patent Office 3,107,227
Patented Oct. 15, 1963

3,107,227
COMPOSITION COMPRISING A POLYMETHYL ETHER OF A POLYMETHYLOL MELAMINE AND AN AMINE SALT OF A COPOLYMER OF AN UNSATURATED MONOCARBOXYLIC ACID AND AN ALKYL ESTER OF SUCH AN ACID
Tzeng Jiueq Suen, New Canaan, and Mary T. Burgess, Byram, Conn., assignors to American Cyanamid Company, New York, N.Y., a corporation of Maine
No Drawing. Filed Nov. 15, 1960, Ser. No. 69,286
15 Claims. (Cl. 260—45.2)

This invention relates to a novel composition of matter and, more particularly, to a composition of matter capable of producing glossy, continuous films comprising a physical mixture of a water-soluble potentially thermosetting polymethyl ether of a polymethylol melamine and a water-soluble amine salt of a copolymer of an alpha, beta-ethylenically unsaturated carboxylic acid and an alkyl ester of an alpha, beta-ethylenically unsaturated monocarboxylic acid, wherein the said amine has a boiling point of at least 200° C. and contains at least 1 hydroxyl group. Still further, this invention relates to novel coating compositions which produce glossy films notwithstanding the fact that they are drawn down from aqueous dispersions of a mixture of resinous materials. Still further, this invention relates to coating compositions comprising aqeuous dispersions of polymethyl ethers of polymethylol melamines in admixture with a water-soluble amine salt of a copolymer of an alpha,beta-ethylenically unsaturated carboxylic acid and an alkyl ester of an alpha,beta-ethylenically unsaturated monocarboxylic acid which aqueous dispersion is stable on standing even after prolonged storage.

One of the objects of the present invention is to prepare a novel composition of matter which is capable of producing glossy, continuous films comprising a water-soluble potentially thermosetting polymethyl ether of a polymethylol melamine and a water-soluble amine salt of a copolymer comprising an alpha, beta-ethylenically unsaturated carboxylic acid and an alkyl ester of an alpha-beta-ethylenically unsaturated monocarboxylic acid.

A further object of the present invention is to prepare coating compositions comprising aqueous dispersions of the novel compositions of the present invention which remain stable during prolonged storage and which produce glossy, continuous films. A further object of the present invention is to produce a coating composition which has greater utility in the coating resin art because of the fact that it is prepared in an aqueous solution which permits the use thereof without : nning the risk of significant fire hazard. A further object of the present invention is to produce a coating composition in an aqueous medium which, when applied to a substrate and converted to a finish, displays no signs of cratering, blistering or pinholing. These and other objects of the present invention will be discussed in greater detail hereinbelow.

In the preparation of the water-soluble copolymers used in the composition of the present invention, one of the essential reactants is an alpha,beta-ethylenically unsaturated carboxylic acid. This class of acids includes not only the monocarboxylic acids but includes as well the polycarboxylic acids. Amongst the monocarboxylic acids which may be used to prepare the copolymers of the present invention are such acids as acrylic, beta-benzoyl acrylic, methacrylic, cinnamic, crotonic and the like. Amongst the alpha,beta-unsaturated polycarboxylic acids which may be used in the preparation of the copolymers used in the present invention are the maleic, fumaric, itaconic, citraconic, mesaconic, aconitic; and the halogenated acids such as halogenated maleic, chloromaleic acid and the like. Quite obviously, these acids may be used either singly or in combination with one another. Whenever available, anhydrides of these acids may be used either singly or in combination with one another or with the acids.

As a second essential component to the water-soluble copolymers used in the present invention, there are the alkyl esters of the alpha,beta-unsaturated monocarboxylic acid such as methyl acrylate, ethyl acrylate, propyl acrylate, butyl acrylate, octyl acrylate, decyl acrylate, lauryl acrylate, ethyl methacrylate, butyl methacrylate, heptyl methacrylate, decyl methacrylate, propyl crotonate, butyl crotonate, nonoyl crotonate, and the like. These alkyl esters may be used either singly or in combination with one another.

There are certain other polymerizable vinylidene monomers such as those containing the polymerizable $CH_2=C<$ groups which may be used to advantage with the alpha,beta unsaturated carboxylic acids and the alkyl esters of the alpha,beta-ethylenically unsaturated monocarboxylic acids. Included in such groups are such polymerizable vinyl compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthene acrylonitrile, methacrylonitrile, halo ring or side chain styrenes such as α-chloro styrene, ortho-, meta- or parachloro styrenes, 2,4-dichloro styrene, 2,3-dichloro styrene, 2,5-dichloro styrene or the alkyl side chain styrenes such as α-methyl styrene, α-ethyl styrene and the like. Additionally, one may make use of such polymerizable vinyl monomers as acrylamide, methacrylamide, ethacrylaminde, ethylenebisacrylamide, N-tertiarybutylacrylamide and the like. These additional monomers may be used either singly or in combination with one another or may be left out of the composition entirely. The amount of monomer of diminished water solubility will vary considerably and directly in amount with the avaliable hydrophilic groups in the pc \er. When 50% of acrylic acid is used in the po.) ner, larger amounts of a monomer such as styrene may be used whereas when 5% of acrylic acid is used, little or no styrene should be used. As a result of this limitation, it is generally advisable to use not more than 50% by weight of these polymerizable monomers in the total weight of the ultimate copolymer comprises the ethylenically unsaturated acid and the alkyl ester of the ethylenically unsaturated monocarboxylic acid.

The copolymers used in the present invention are rendered water-soluble by reaction with a water-soluble amine having a boiling point of at least 200° C. and containing at least one hydroxyl group to form the amine salt of the copolymer. The amount of amine used to produce the water-soluble salt of the copolymer may be varied over a fairly wide range. For instance, one may use a sufficient amount of amine to form the half salt by using ½ mol equivalent of amine per mol of carboxyl groups available in the copolymer as produced. One may furthermore use a full equivalent of amine per mol equivalent of carboxyl group present in the copolymer as prepared. Still further, one could use an excess of amine to insure complete salt formation in amounts up to and even exceeding 4 mol equivalents of amine per mol of carboxyl group present in the copolymer. Among the water-soluble amines which may be used to prepare the salts of the copolymers used in the composition of the present invention are: diethanolamine, triethanolamine, diisopropanolamine, triisopropanolamine, 2-amino-2-methyl-1,3-propanediol, N-aminoethylethanolamine, N-methyldiethanolamine, N-ethyldiethanolamine, N-propyldiethanolamine, N-methyldiisopropanolamine, N-ethyldiisopropanolamine, N-propyldiisopropanolamine, N-tertiarybutyldiethanolamine, diisobutanolamine, triisobutanolamine, polyglycolamines, such as diethyleneglycolmonoamine, dipropyleneglycolmonoamine, glycerolmonoamine, diglycerolamine, and the like.

As the second principal component of the composition mixture of the present invention, one will use the water-soluble potentially thermosetting polymethyl ethers of polymethylol melamines. The polymethyl ether will encompass the dimethyl ether, the trimethyl ether, the tetramethyl ether, the pentamethyl ether and the hexamethyl ether of polymethylol melamines. In preparing the polymethylol melamines, one must react at least 2 mols of formaldehyde and preferably at least 3 mols of formaldehyde with each mol of melamine under known reaction conditions in order to produce the water-soluble polymethylol melamine such as trimethylol melamine and the like. The preferred methyl ether of polymethylol melamine is the hexamethoxyhexamethylol melamine. The ratio of the water-soluble potentially thermosetting polymethyl ether of polymethylol melamine to the water-soluble amine salt of the copolymer may be varied over a fairly wide range. For instance, one may use between about 10% to about 50% by weight of the methylol melamine material to a corresponding 90% to 50% by weight of the water-soluble copolymer.

The water-soluble copolymers used in the composition of the present invention may be prepared by reacting alkyl esters of alpha,beta-unsaturated monocarboxylic acids and alpha,beta-unsaturated carboxylic acids in proportions which vary over a fairly wide range. For instance, one may use between about 50% and 95% by weight of the alkyl esters of the alpha,beta-unsaturated monocarboxylic acids to a correspondingly 50% to 5% by weight of the alpha,beta-unsaturated carboxylic acids. Preferably, one would use about 75% to 90% by weight of the alkyl ester of the alpha,beta-ethylenically unsaturated monocarboxylic acid to about 25 to 10% by weight of the alpha,beta-ethylenically unsaturated carboxylic acid. If a third component of the class described hereinabove is to be utilized in the preparation of these water-soluble copolymers, it may be present in an amount up to about 50% by weight based on the total weight of the copolymer solids.

In the use of these mixtures of the thermosetting resin-forming reaction products with the water-soluble copolymers of the present invention, it is not imperative that a catalyst be used, although one may be used as a matter of choice. The catalyst used may be any of the conventional catalytic materials, many of which have been disclosed in the prior art and which are water-soluble or at least water dispersible. The amount of catalyst which may be used obviously can be varied over a considerable range, as the prior art clearly teaches.

The compositions of the present invention have a considerable number of advantages over the prior art compositions, particularly when these compositions are being used as coating compositions. In addition to the already mentioned advantage of not presenting a fire hazard threat, the compositions of the present invention are of very low toxicity as the solvent, being water, is far more desirable than the toxic solvents such as xylol and even the less toxic organic solvents such as mineral spirits. Additionally, the compositions of the present invention can be prepared far less expensively than their organic solvent equivalents and thus make the compositions of the present invention more desirable because they are far less expensive.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

COPOLYMER A

Into a suitable reaction vessel equipped with stirrer, thermometer and reflux condenser, there is introduced 97.4 parts of dioxane and the charge is heated to reflux. A monomer mixture of 756 parts of butyl acrylate and 127.2 parts of acrylic acid together with 3.54 parts of butyl mercaptan is added gradually at a uniform rate over a period of 4 hours. During this addition, there is added separately, in small increments, 17.7 parts of ditertiary butyl peroxide. When the addition of the monomers and the catalyst is complete, the charge is maintained at the reflux temperature with constant stirring for about 3 additional hours.

*Example 1*

A solution of 29.1 parts of triethanolamine in 124 parts of deionized water is slowly introduced into 147.4 parts of copolymer A at 80–90° C. with agitation. A clear solution is obtained with a calculated dry solids content of 45%. The clear solution is blended with 35 parts of hexamethylether of hexamethylol melamine so as to provide a weight ratio of 35:65 melamine compound to copolymer A respectively, on a solids basis. A sufficient amount of p-toluene sulfonic acid sufficient to equal 2% by weight based on the weight of the melamine compound is then added. After blending with a chosen pigment, enamel films are drawn down on steel plates which are baked for 30 minutes at 300° F. The baked films produced displayed excellent gloss but no blistering, cratering or pin-holing.

*Example 2*

Example 1 is repeated in all details except that an equivalent amount of triisopropanolamine is used in the place of triethanolamine. The ultimate finished films are of excellent appearance but display no surface defects.

*Example 3*

Example 1 is repeated in all details except that an equivalent amount of 2-amino-2-methyl-1,3-propanediol is used in the place of the triethanolamine. The ultimate films produced are excellent in appearance and display no cratering, blistering or pinholing.

COPOLYMER B

Into a suitable reaction vessel equipped as in copolymer A, there is introduced 30.5 parts of dimethyl formamide and 25 parts of dioxane. The charge is heated with stirring to reflux. Thereupon a mixture of 150 parts of styrene, 250 parts of butylacrylate, 100 parts of acrylic acid and 10 parts of ditertiary butyl peroxide are added in small increments over a period of 4 hours. After the addition of the monomercatalyst mix, the charge is maintained at reflux with constant stirring for an additional 1 hour period before cooling. When the copolymer A has been cooled to about 90° C. a mixture of water and triisopropanolamine (2.0 equivalents) are added in small increments to the copolymer solution over a period of ½ hour. The mixture is then stirred for an additional hour at 75° C. and then cooled to room temperature.

*Example 4*

Example 2 is repeated in all details except that in the place of copolymer A, neutralized with triisopropanolamine, there is added an equivalent amount of copolymer B neutralized with triisopropanolamine. Films drawn down from the blended resinous composition are baked as before to produce hard glossy films which display no cratering, blistering or pinholing.

Attention is directed to the U.S. Patent 2,906,724 which discloses and claims a class of water-soluble coating resins which are very versatile and useful in the production of industrial baking finishes. These compositions are excellent coating compositions but because of the presence of the ammonia in the composition certain difficulties had been experienced in producing baked films therefrom. In using these coating compositions of the prior art, it has been found to be necessary to leave the wet films out of the baking oven for a comparatively long period of time before the baking step could be undertaken. Delays of 15 minutes and longer were experienced. As long as this delay before baking was tolerated the films produced were substantially without defect. However, if the wet films of the reference patent were to be introduced immediately into the baking oven, severe blistering of the films would be experienced. Notwithstanding industries' high regard for the films which these prior art compositions are capable of producing, it could not tolerate the prolonged waiting period prior to the baking step. We have discovered that by utilizing water-soluble amines, having a boiling point of at least 200° C. and having at least 1 hydroxyl group, to neutralize the acidic polymeric material that one could draw down films and introduce said wet films immediately into the baking oven without experiencing any surface defects such as those mentioned in considerable detail hereinabove. A further shortcoming of the compositions of the prior art as noted above resides in the fact that if the wet films are introduced into the baking oven immediately, one experiences some significant deterioration of gloss in the ultimate film produced. Such is not the case in the use of the compositions of the present invention, but rather wet films baked immediately display excellent gloss and excellent gloss retention.

The compositions of the present invention can be baked satisfactorily ot hard cure without the use of any catalytic material. However, for efficient commercial usage acidic catalysts may be used. These catalysts are well known in the art of melamine resins and may be used in the conventional catalytic quantities. Para-toluene sulfonic acid is the preferred acidic catalyst.

We claim:

1. A composition of matter comprising a mixture of (1) 50% to 10% by weight of a water-soluble potentially thermosetting polymethyl ether of a polymethylol melamine and (2) 50% to 90% by weight of a water-soluble amine salt of a copolmer comprising (a) 5% to 50% by weight of an ethylenically unsaturated carboxylic acid and (b) 50% to 95% by weight of an alkyl ester of an alpha,beta-ethylenically unsaturated monocarboxylic acid, wherein the said amine has a boiling point of at least 200° C. and contains at least 1 hydroxyl group.

2. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of an alpha,beta-ethylenically unsaturated monocarboxylic acid and (b) 50% to 95% by weight of an alkyl ester of an alpha,beta-ethylenically unsaturated monocarboxylic acid, wherein the said amine has a boiling point of at least 200° C. and contains at least 1 hydroxyl group.

3. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of acrylic acid and (b) 50% to 95% by weight of an alkyl ester of an alpha,beta-ethylenically unsaturated monocarboxylic acid, wherein the said amine has a boiling point of at least 200° C. and contains at least 1 hydroxyl group.

4. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of acrylic acid and (b) 50% to 90% of butyl acrylate, wherein the said amine has a boiling point of at least 200° C. and contains at least 1 hydroxyl group.

5. A composition of matter comprising a mixture of (1) 50% to 10% by weight of the hexamethyl ether of hexamethylol melamine and (2) 50% to 90% by weight of a water-soluble amine salt of a copolymer comprising (a) 5% to 50% by weight of acrylic acid and (b) 50% to 95% of butyl acrylate, wherein the said amine has a boiling point of at least 200° C. and contains at least 1 hydroxyl group.

6. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of methacrylic acid and (b) 50% to 95% by weight of an alkyl ester of an alpha,beta-ethylenically unsaturated monocarboxylic acid, wherein said amine has a boiling point of at least 200° C. and contains at least 1 hydroxyl group.

7. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of methacrylic acid and (b) 50% to 95% by weight of butyl acrylate, wherein said amine has a boiling point of at least 200° C. and contains at least 1 hydroxyl group.

8. A composition of matter comprising a mixture of (1) 50% to 10% by weight of a water-soluble potentially thermosetting polymethyl ether of a polymethylol melamine and (2) 50% to 90% by weight of a water-soluble amine salt of a copolymer comprising (a) 5% to 50% by weight of methacrylic acid and (b) 50% to 95% by weight of ethyl acrylate, wherein said amine has a boiling point of at least 200° C. and contains at least 1 hydroxyl group.

9. A composition of matter comprising a mixture of (1) 50% to 10% by weight of the hexamethyl ether of hexamethylol melamine and (2) 50% to 90% by weight of a water-soluble amine salt of a copolymer comprising (a) 5% to 50% by weight of an ethylenically unsaturated carboxylic acid and (b) 50% to 95% by weight of an alkyl ester of an alpha,beta-ethylenically unsaturated monocarboxylic acid, wherein the said amine has a boiling point of at least 200° C. and contains at least one hydroxyl group.

10. A composition of matter comprising a mixture of (1) 50% to 10% by weight of a water-soluble potentially thermosetting polymethyl ether of a polymethylol melamine and (2) 50% to 90% by weight of the triisopropanolamine salt of a copolymer comprising (a) 5% to 50% by weight of an ethylenically unsaturated carboxylic acid and (b) 50% to 95% by weight of an alkyl ester of an alpha-beta-ethylenically unsaturated monocarboxylic acid.

11. A composition of matter comprising a mixture of (1) 50% to 10% by weight of a water-soluble potentially thermosetting polymethyl ether of a polymethylol melamine and (2) 50% to 90% by weight of the diisopropanolamine salt of a copolymer comprising (a) 5% to 50% by weight of an ethylenically unsaturated carboxylic acid and (b) 50% to 95% by weight of an alkyl ester of an alpha,beta-ethylenically unsaturated monocarboxylic acid.

12. A composition of matter comprising a mixture of (1) 50% to 10% by weight of a water-soluble potentially thermosetting polymethyl ether of a polymethylol melamine and (2) 50% to 90% by weight of the triethanolamine salt of a copolymer comprising (a) 5% to 50% by weight of an ethylenically unsaturated carboxylic acid and (b) 50% to 95% by weight of an alkyl ester of an alpha,beta-ethylenically unsaturated monocarboxylic acid.

13. A composition of matter comprising a mixture of (1) 50% to 10% by weight of a water-soluble potentially thermosetting polymethyl ether of a polymethylol melamine and (2) 50% to 90% by weight of the 2-amino-2-methyl-1,3-propanediol of a copolymer comprising (a) 5% to 50% by weight of an ethylenically unsaturated carboxylic acid and (b) 50% to 95% by weight of an alkyl ester of an alpha,beta-ethylenically unsaturated monocarboxylic acid.

14. A composition of matter comprising a mixture of (1) 50% to 10% by weight of a water-soluble potentially thermosetting polymethyl ether of a polymethylol melamine and (2) 50% to 90% by weight of the diethanolamine salt of a copolymer comprising (a) 5% to 50% by weight of an ethylenically unsaturated carboxylic acid and (b) 50% to 95% by weight of an alkyl ester of an alpha,-beta-ethylenically unsaturated monocarboxylic acid.

15. A composition of matter comprising a mixture of (1) 50% to 10% by weight of the hexamethyl ether of hexamethylol melamine and (2) 50% to 90% by weight of the triisopropanolamine salt of a copolymer comprising (a) 5% to 50% by weight of acrylic acid and (b) 50% to 95% by weight of butyl acrylate.

References Cited in the file of this patent
UNITED STATES PATENTS

| | | |
|---|---|---|
| 2,906,724 | Daniel | Sept. 29, 1959 |
| 2,918,391 | Hornibrook | Dec. 22, 1959 |

UNITED STATES PATENT OFFICE
CERTIFICATE OF CORRECTION

Patent No. 3,107,227　　　　　　　　　　　　　　　　October 15, 1963

Tzeng Jiueq Suen et al.

It is hereby certified that error appears in the above numbered patent requiring correction and that the said Letters Patent should read as corrected below.

Column 2, line 32, for "ethacrylaminde" read -- ethacrylamide --; line 38, for "avaliable" read -- available --; same column 2, line 45, for "comprises" read -- comprising --; column 4, lines 21 and 22, for "provied" read -- provide --; column 5, line 31, for "ot" read -- to --.

Signed and sealed this 7th day of April 1964.

(SEAL)
Attest:

ERNEST W. SWIDER

Attesting Officer

EDWARD J. BRENNER

Commissioner of Patents